United States Patent
Wang et al.

(10) Patent No.: US 12,051,818 B2
(45) Date of Patent: Jul. 30, 2024

(54) BATTERY CUSHION AND FORMING METHOD THEREOF, AND BATTERY MODULE AND FORMING METHOD THEREOF

(71) Applicant: CONTEMPORARY AMPEREX TECHNOLOGY CO., LIMITED, Ningde (CN)

(72) Inventors: Guangjun Wang, Ningde (CN); Yonghuang Ye, Ningde (CN); Jiawei Zheng, Ningde (CN); Shaojun Niu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 477 days.

(21) Appl. No.: 17/139,811

(22) Filed: Dec. 31, 2020

(65) Prior Publication Data
US 2021/0126317 A1  Apr. 29, 2021

Related U.S. Application Data

(63) Continuation of application No. PCT/CN2019/110917, filed on Oct. 14, 2019.

(30) Foreign Application Priority Data

Oct. 22, 2018  (CN) .................. 201821712200.X

(51) Int. Cl.
*H01M 50/242*  (2021.01)
*H01M 50/209*  (2021.01)
(Continued)

(52) U.S. Cl.
CPC ....... *H01M 50/242* (2021.01); *H01M 50/209* (2021.01); *H01M 50/211* (2021.01); *H01M 50/291* (2021.01)

(58) Field of Classification Search
CPC .................................................. H01M 50/242
See application file for complete search history.

(56) References Cited

U.S. PATENT DOCUMENTS 4,174,014 A * 11/1979 Bjorksten ........... H01M 50/293
                                                                180/68.5
2004/0119185 A1   6/2004 Chen
(Continued)

FOREIGN PATENT DOCUMENTS

CN   204936807 U      1/2016
CN   206541873 U  *  10/2017
(Continued)

OTHER PUBLICATIONS

Picture of HT-800 Silicone Foam from Rogers Corp. via. Amazon. com; first available for purchase on Amazon.com Oct. 16, 2014 (Year: 2014).*

(Continued)

*Primary Examiner* — Maria Laios
*Assistant Examiner* — Jordan E Berresford
(74) *Attorney, Agent, or Firm* — Kilpatrick Townsend & Stockton LLP

(57) ABSTRACT

This application discloses a battery cushion and a forming method thereof, and a battery module and a forming method thereof. The battery cushion includes a body and breakable bubbles. The breakable bubbles are disposed in the body. The breakable bubbles include at least a first bubble and a second bubble. A breaking pressure of the first bubble is less than a breaking pressure of the second bubble, so that the battery cushion can release a space occupied by the battery cushion in a progressive manner under different external forces. The battery cushion disclosed in this application can not only achieve a pre-tightening force required during assembly of the battery module but also effectively relieve an expansive force generated during working of the battery module.

15 Claims, 3 Drawing Sheets

(51) Int. Cl.
*H01M 50/211* (2021.01)
*H01M 50/291* (2021.01)

(56) References Cited

U.S. PATENT DOCUMENTS

| | | | |
|---|---|---|---|
| 2009/0008142 A1* | 1/2009 | Shimizu | H05K 1/036 428/209 |
| 2012/0115035 A1* | 5/2012 | Ota | H01G 11/70 361/523 |
| 2014/0045024 A1 | 2/2014 | Waters | |
| 2015/0037653 A1 | 2/2015 | Saito et al. | |
| 2016/0197319 A1 | 7/2016 | Waters | |
| 2017/0018746 A1 | 1/2017 | Kritzer et al. | |

FOREIGN PATENT DOCUMENTS

| | | | | |
|---|---|---|---|---|
| CN | 206541873 U | 10/2017 | | |
| CN | 207572431 U | 7/2018 | | |
| CN | 208674236 U | 3/2019 | | |
| EP | 2832542 A1 | 2/2015 | | |
| EP | 3118910 A1 | 1/2017 | | |
| EP | 2832542 B1 | 10/2020 | | |
| JP | 2000247763 A | * 9/2000 | | C04B 16/08 |
| KR | 101331027 B1 | * 4/2013 | | |

OTHER PUBLICATIONS

International Search Report and Written Opinion, PCT/CN2019/110917, Jan. 15, 2020, 10 pgs.
Contemporary Amperex Technology Co., Limited, Extended European Search Report, EP19874907.9, Jun. 30, 2021, 8 pgs.
Contemporary Amperex Technology Co., Limited, Intention to Grant, EP19874907.9, Aug. 3, 2022, 21 pgs.

* cited by examiner

BATTERY CUSHION AND FORMING METHOD THEREOF, AND BATTERY MODULE AND FORMING METHOD THEREOF

CROSS-REFERENCE TO RELATED APPLICATIONS

This application is a continuation application of PCT Patent Application No. PCT/CN2019/110917, entitled "BATTERY CUSHION PAD AND MOLDING METHOD, AND BATTERY MODULE AND MOLDING METHOD" filed on Oct. 14, 2019, which claims priority to Chinese Patent Application No. 201821712200.X, filed with the State Intellectual Property Office of the People's Republic of China on Oct. 22, 2018, and entitled "BATTERY CUSHION AND BATTERY MODULE", all of which are incorporated herein by reference in their entirety.

TECHNICAL FIELD

This application relates to the technical field of batteries, and in particular, to a battery cushion and a battery module.

BACKGROUND

A battery module generally includes multiple cells. During assembly of the battery module, a pre-tightening force is required in the battery module to firmly fasten the cells and ensure good contact of a reaction interface of the cells. A battery cushion generally needs to be arranged in the battery module. The pre-tightening force required in the battery module is achieved by using a reaction force generated by compressing the battery cushion.

In addition, during operation of the battery module, the cells keep expanding. Consequently, the battery cushion keeps being compressed, the reaction force generated by the battery cushion keeps increasing, and a large expansive force is generated in the battery module, so that the battery module is likely to fail and a service life of the battery module is affected.

Therefore, it is necessary to develop a battery cushion that can not only achieve the pre-tightening force required during assembly of the battery module but also effectively relieve the expansive force generated during working of the battery module.

SUMMARY

An objective of this application is to disclose a battery cushion and a forming method thereof, and a pouch-type cell battery module and a forming method thereof to not only achieve a pre-tightening force required during assembly of the battery module but also effectively relieve an expansive force generated during working of the battery module.

A first aspect of this application discloses a battery cushion, including:
  a body; and
  breakable bubbles, disposed in the body, where the breakable bubbles include at least a first bubble and a second bubble, a breaking pressure of the first bubble is less than a breaking pressure of the second bubble, so that the battery cushion can release a space occupied by the battery cushion in a progressive manner under different external forces.

Optionally, a diameter of the first bubble is greater than a diameter of the second bubble.

Optionally, a diameter of each breakable bubble is 10 μm to 1 mm.

Optionally, a lower-limit thickness of a wall of the first bubble is less than a lower-limit thickness of a wall of the second bubble.

Optionally, a thickness of a wall of each breakable bubble is 1 μm to 0.3 mm.

Optionally, the breakable bubbles are uniformly distributed in the body, and a percentage of a volume of the breakable bubbles in a volume of the body is 40% to 90%.

Optionally, a connected pore is further disposed in the body, and the connected pore has a vent and communicates with the outside of the body through the vent.

Optionally, the body is made of an elastic insulating material, and the body is of a flat structure.

Optionally, a thickness of the body is 0.5 mm to 20 mm.

A second aspect of this application discloses a pouch-type cell battery module, including:
  at least two pouch-type cells, arranged in sequence along a thickness direction of the pouch-type cells; and
  a battery cushion, where the battery cushion is any battery cushion disclosed in this application, is disposed between the pouch-type cells; and
  the pouch-type cells press the battery cushion tightly.

A third aspect of this application discloses a battery cushion forming method, including:
  forming breakable bubbles in a body by controlling a foaming process, where the breakable bubbles include at least a first bubble and a second bubble, a breaking pressure of the first bubble is less than a breaking pressure of the second bubble, so that the battery cushion can release a space occupied by the battery cushion in a progressive manner under different external forces.

Optionally, the forming breakable bubbles in a body by controlling a foaming process includes:
  controlling the foaming process so that the first bubble and the second bubble are uniformly distributed in a longitudinal section of the body and a cross section of the body.

A fourth aspect of this application discloses a battery module forming method, including:
  pressing a battery cushion tightly with pouch-type cells, where the battery cushion is formed by using the battery cushion forming method disclosed in this application.

Optionally, the pressing a battery cushion tightly with pouch-type cells includes:
  arranging the pouch-type cells in sequence along a thickness direction of the pouch-type cells; and
  disposing the battery cushion between the pouch-type cells.

The technical solutions disclosed in this application achieve the following beneficial effects:

The breakable bubbles are disposed in the body of the battery cushion disclosed in this application. The breakable bubbles include at least the first bubble and the second bubble. The breaking pressure of the first bubble is less than the breaking pressure of the second bubble. In a case that the cells expand during working, the battery cushion is compressively deformed. As the battery cushion keeps being compressed, the expansive force in the battery module keeps increasing. In a case that the expansive force in the battery module reaches the breaking pressure of the first bubble, the first bubble is broken and releases a space occupied by the battery cushion to reduce the expansive force in the battery module. The second bubble refrains from breaking so as to maintain the pre-tightening force in the battery module.

Understandably, the above general description and the following detailed description are only exemplary without limiting this application.

REFERENCE NUMERALS

Figure 1:
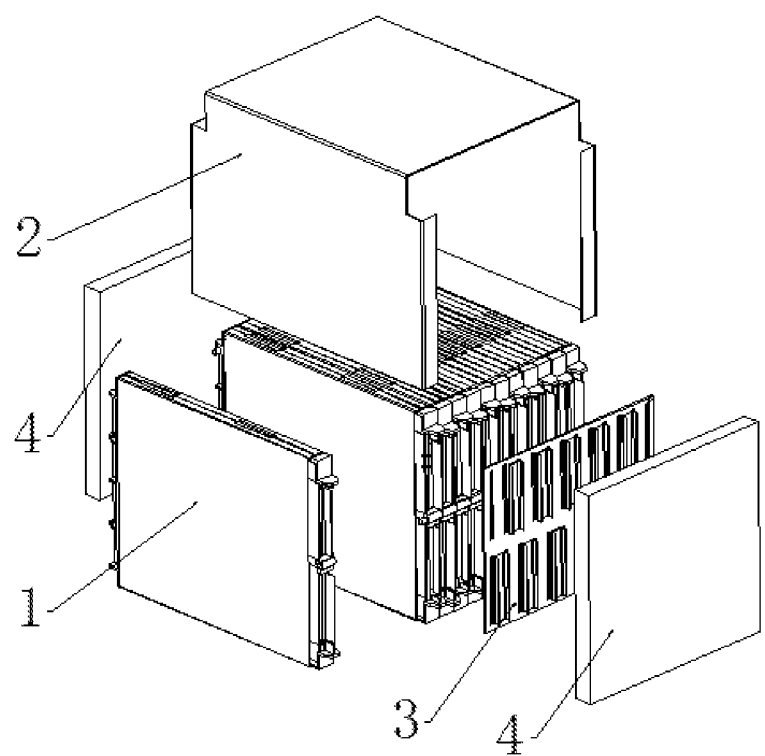
FIG. 1 is a schematic structural diagram of a battery module according to this application.

1: Module cell;
10: Battery cushion;
100: Body;
102: Breakable bubbles;
1020: First bubble;
1022: Second bubble;
104: Connected pore;
12: Fastening framework;
120: Cell accommodation cavity;
14: Pouch-type cell;
16: Thermally conductive plate;
2: Outer metal frame;
3: Wire harness separator; and
4: End plate.

The drawings described here are incorporated into the specification as a part of the specification. The drawings illustrate embodiments of this application and are used together with the specification to explain the principles of this application.

DESCRIPTION OF EMBODIMENTS

The following describes this application in further detail with reference to specific embodiments and accompanying drawings.

The words of direction such as "on", "above", "under", "below", "left", and "right" described in the embodiments of this application are described from a perspective shown in the drawings, and shall not be understood as a limitation on the embodiments of this application. In addition, understandably, depending on the context, one element mentioned as being connected "on" or "under" another element not only means that the element may be directly connected "on" or "under" the other element, but also means that the element may be indirectly connected "on" or "under" the other element through an intermediate element.

As shown in FIG. 1 to FIGS. 3A-3B, a battery module disclosed in an embodiment of this application includes at least two (multiple) pouch-type cells 14 and a battery cushion 10. The pouch-type cells 14 are arranged in sequence along a thickness direction of the pouch-type cells. The battery cushion 10 is disposed between the pouch-type cells 14, and the pouch-type cells 14 press the battery cushion 10 tightly so that the pouch-type cells 14 meet a preset pre-tightening force requirement. In a case that the battery module expands during working, the battery cushion 10 can release a space occupied by the battery cushion to effectively relieve an expansive force within the battery module.

The battery module may further include an outer metal frame 2. The outer metal frame 2 is configured as a U-shaped structure. Each of two sidewalls of the outer metal frame 2 is in contact with two ends that are of the battery module and that are in the thickness direction of the pouch-type cells 14. Therefore, the multiple pouch-type cells 14 and the battery cushion 10 can press each other tightly to meet the pre-tightening force requirement within the battery module and prevent the battery module from loosening. An end plate 4 may be disposed at each of the two ends of the U-shaped structure (the two ends along a length direction of the pouch-type cells 14). The end plate 4 is welded to each of the two ends of the U-shaped structure, and forms, together with the U-shaped structure, a casing of the battery module to protect the battery module on the whole. The multiple pouch-type cells 14 may be electrically connected through a wire harness separator 3.

Figure 2:
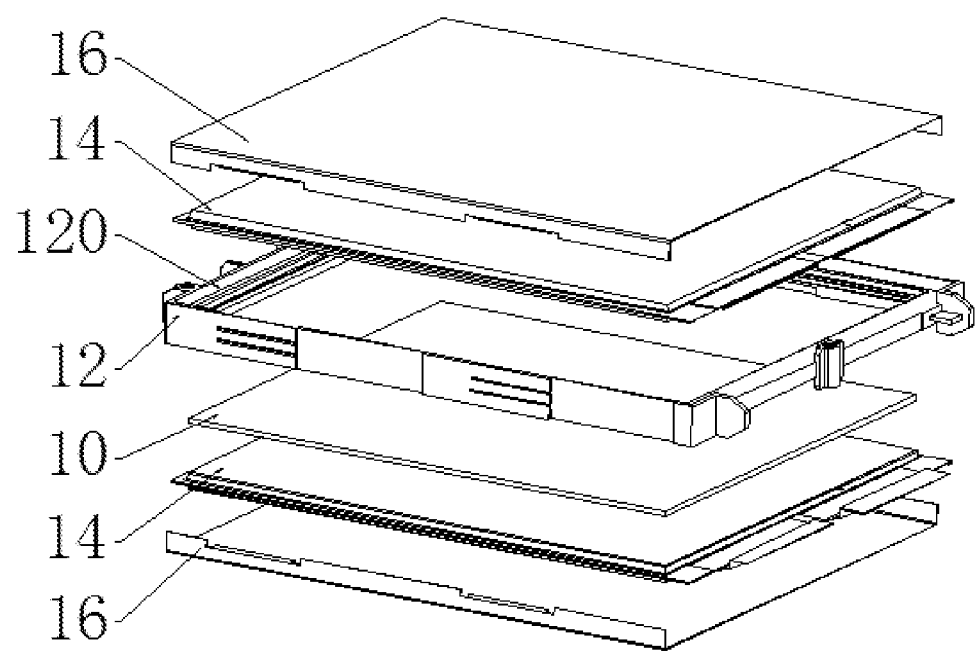
FIG. 2 is a schematic exploded view of a module cell shown in FIG. 1.

As shown in FIG. 2, the battery module disclosed in this application may further include a fastening framework 12. The fastening framework 12, the battery cushion 10, and the pouch-type cells 14 constitute a module cell, thereby simplifying assembly of the battery module and fastening the pouch-type cells 14 and the battery cushion 10 more firmly. The battery cushion 10 is disposed in the fastening framework 12, and divides the fastening framework 12 into at least two cell accommodation cavities 120 along a thickness direction of the fastening framework. The pouch-type cells 14 are disposed in the cell accommodation cavities 120, and press the battery cushion 10 tightly. The pouch-type cells 14 on both sides of the battery cushion 10 can share one battery cushion 10, thereby reducing the quantity of battery cushions 10, reducing the size of the battery module, and increasing an energy density of the battery module.

Further, the module cell 1 may further include a thermally conductive plate 16. The thermally conductive plate 16 may be a metal plate of high thermal conductivity, such as an aluminum plate. The thermally conductive plate 16 is disposed on one side of the pouch-type cell 14 away from the battery cushion 10, so as to reduce a temperature on one side of the pouch-type cell 14 away from the battery cushion 10 and control the pouch-type cell 14 to expand toward a center location of the fastening framework 12.

Figure 3A:
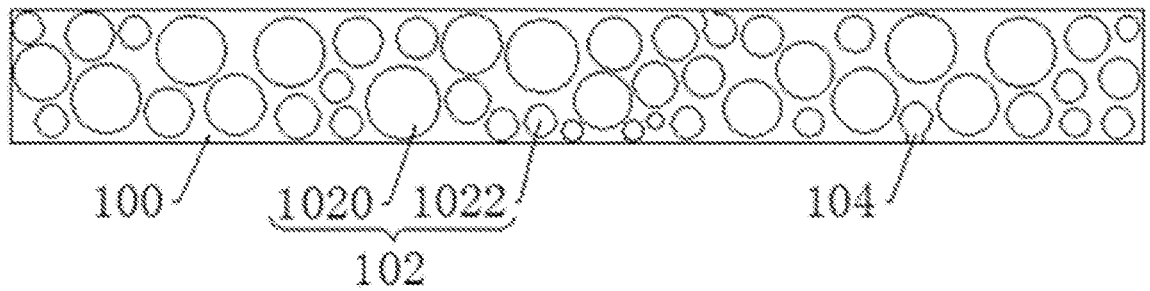
FIG. 3A is a schematic cross-sectional view of a battery cushion according to this application.
Figure 3B:
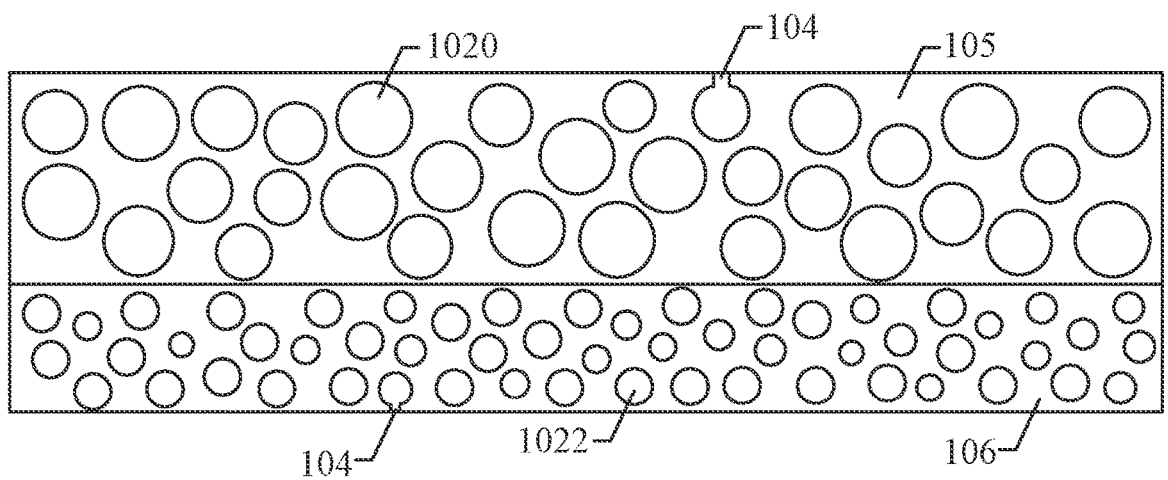
FIG. 3B is a schematic cross-sectional view of another battery cushion according to this application.

As shown in FIGS. 3A-3B, the battery cushion 10 disclosed in this application includes a body 100. During assembly of the battery module, the battery cushion 10 is compressively deformed to meet the pre-tightening force requirement in the battery module. During working of the battery module, the cells expand and the battery cushion 10 keeps being compressed. Under an extrusion force, the breakable bubbles 102 can be broken and release the space occupied by the battery cushion to effectively relieve the expansive force in the battery module. The breakable bubbles 102 include at least a first bubble 1020 and a second bubble 1022. A breaking pressure of the first bubble 1020 is less than a breaking pressure of the second bubble 1022, so that the battery cushion 10 releases the space occupied by the battery cushion in a progressive manner according to different external forces. In other words, as the battery cushion 10 keeps being compressed, the expansive force in the battery module keeps increasing, the first bubble 1020 is broken first and releases the space occupied by the battery cushion to reduce the expansive force in the battery module. The second bubble 1022 refrains from breaking so as to maintain the pre-tightening force in the battery module and effectively extend a service life of the battery module. Understandably, the battery cushion 10 may have a variety of breakable bubbles 102 that break under different breaking pressures, thereby forming more terraces, releasing the space occupied by the battery cushion hierarchically, and better adapting to expansive forces in the battery module.

Further, the breakable bubbles 102 may include at least two types of bubbles that have different diameters. The first bubble 1020 has a greater diameter, breaks under a lower breaking pressure, and provides a larger space occupied by the battery cushion. In a case of breaking, the first bubble 1020 releases a larger space occupied by the battery cushion, and effectively reduces the expansive force in the battery module. The second bubble 1022 has a smaller diameter, breaks under a higher breaking pressure, and provides a smaller space occupied by the battery cushion and a greater reaction force to maintain the pre-tightening force in the battery module after the first bubble 1020 is broken, thereby meeting both the space occupied by the battery cushion requirement and the pre-tightening force requirement of the pouch-type cells.

Exemplarily, diameters of the breakable bubbles 102 are 10 μm to 1 mm, so that the breakable bubbles are easy to implement and can meet the space occupied by the battery cushion requirement and the pre-tightening force requirement. Within such a range, the diameters of the breakable bubbles 102 may be reasonably distributed in at least two sections, and two adjacent sections may be continuous or spaced apart from each other. Exemplarily, two adjacent sections are spaced apart from each other (for example, the diameter of the first bubble 1020 is 10 μm to 300 μm, and the diameter of the second bubble 1022 is 500 μm to 1 mm), so that the breaking pressure of the first bubble 1020 is obviously different from the breaking pressure of the second bubble 1022.

Further, the breakable bubbles 102 may include at least two types of bubbles whose walls have different lower-limit thicknesses. The wall of the first bubble 1020 has a smaller lower-limit thickness and breaks under a lower breaking pressure. The wall of the second bubble 1022 has a greater lower-limit thickness and breaks under a higher breaking pressure. The thickness of the wall of a breakable bubble 102 is not uniform, and the breakable bubble 102 generally breaks at a fragile position where the wall is the thinnest. Therefore, terraced break can be implemented by configuring different lower-limit thicknesses of the walls of the breakable bubbles 102. By controlling the lower-limit thicknesses of the walls of the breakable bubbles 102, the terraced break of the breakable bubbles 102 is easier to control and operate.

In a case that the lower-limit thickness of the wall of a breakable bubble 102 is too small, the breakable bubble 102 is likely to break under the pre-tightening force and fails. In a case that the lower-limit thickness of the wall of the breakable bubble 102 is too great, the breakable bubble 102 is not likely to break even under a large extrusion force and loses a cushioning effect. Therefore, exemplarily, the lower-limit thickness of the wall of the breakable bubbles 102 according to this embodiment is 1 μm to 0.3 mm.

Further, the breakable bubbles 102 are uniformly distributed in the body 100, and specifically but without limitation, uniformly distributed in a longitudinal section of the body 100 (the section along a thickness direction of the body 100) and uniformly distributed in a cross section of the body 100 (the section along an extension direction of the body 100). In this way, the battery cushion 10 has exactly the same compression performance in any direction, the battery cushion 10 can be uniformly compressed, a reliable contact is achieved between a side of each pouch-type cell 14 and the battery cushion 10 to prevent tilting, and a good contact of a reaction interface of the cells is ensured.

Specifically, in a case that the breakable bubbles 102 include a first bubble 1020 and a second bubble 1022, the first bubble 1020 and the second bubble 1022 are uniformly mixed and uniformly distributed in the body 100. That is, the first bubble 1020 and the second bubble 1022 are not hierarchical. This implementation is easy to operate and achieves exactly the same compression performance of the battery cushion 10 everywhere in a thickness direction of the battery cushion.

Optionally, the first bubble 1020 and the second bubble 1022 may be disposed hierarchically (along the thickness direction of the battery cushion 10), and the first bubble 1020 and the second bubble 1022 are uniformly distributed each in a corresponding layer (e.g., the first bubble 1020 are distributed in a first layer 105, and the second bubble 1022 are distributed in a second layer 106 shown in FIG. 3B). In this way, the battery cushion 10 can release the space occupied by the battery cushion hierarchically, and the battery cushion 10 can be uniformly compressed.

Exemplarily, a percentage of a volume of the breakable bubbles 102 in a volume of the body 100 is 40% to 90%, so that the battery cushion 10 has both high compression performance and resilience.

Specifically, the diameter and the wall thickness of the bubbles may be controlled by controlling a foaming process, for example, by controlling a foaming temperature, the quantity of a foaming agent, and a foaming time.

Further, a connected pore 104 may be disposed in the body 100. The connected pore 104 has a vent and communicates with the outside of the body 100 through the vent. The connected pore 104 does not form a closed space, and therefore, the connected pore 104 will not break under an extrusion force, so that the battery cushion 10 is always resilient to ensure a reliable pre-tightening force in the battery module.

Further, the body 100 is made of an elastic insulating material, and the body 100 is of a flat structure to form a steady contact support for the pouch-type cells 14 and prevent damage to the pouch-type cells 14 or deformation of a surface of the pouch-type cells 14. Specifically, the elastic insulating material may include rubber, silicon foam, polyurethane foam, and the like.

Exemplarily, a thickness of the body 100 is 0.5 mm to 20 mm. In this way, after the pouch-type cells 14 press the battery cushion 10 tightly, the battery cushion 10 can provide a pre-tightening force for the pouch-type cells 14 and still retain a space occupied by the battery cushion.

An embodiment of this application further discloses a battery cushion forming method, including:

forming breakable bubbles in a body by controlling a foaming process, where the breakable bubbles include at least a first bubble and a second bubble, a breaking pressure of the first bubble is less than a breaking pressure of the second bubble, so that the battery cushion can release a space occupied by the battery cushion in a progressive manner under different external forces.

Optionally, the forming breakable bubbles in a body by controlling a foaming process includes:

controlling the foaming process so that the first bubble and the second bubble are uniformly distributed in a longitudinal section of the body and a cross section of the body.

An embodiment of this application further discloses a battery module forming method, including:

pressing a battery cushion tightly with pouch-type cells, where the battery cushion is formed by using the battery cushion forming method disclosed in any embodiment of this application.

Optionally, the pressing a battery cushion tightly with pouch-type cells includes:

arranging the pouch-type cells in sequence along a thickness direction of the pouch-type cells; and disposing the battery cushion between the pouch-type cells.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application shall fall within the protection scope of this application.

What is claimed is:

1. A battery cushion, comprising:
a body made of an elastic insulating material with a flat structure, the body having a first layer and a second layer arranged in a thickness direction; and
a plurality of first bubbles dispersed in the first layer and a plurality of second bubbles dispersed in the second layer, the first bubbles have a first deforming pressure and are configured to deform under an external pressure of or greater than the first deforming pressure to release a space occupied by the first bubbles, the second bubbles have a second deforming pressure and are configured to deform under an external pressure of or greater than the second deforming pressure to release a space occupied by the second bubbles, the first deforming pressure is less than the second deforming pressure, the first bubbles have a first diameter from 10 µm to 300 µm, the second bubbles have a second diameter from 500 µm to 1 mm, and the battery cushion is arranged to release the space occupied by the first and second bubbles in a progressive manner under different external pressures,
wherein the elastic insulating material is selected from the group consisting of rubber, silicon foam, polyurethane foam, or a combination thereof.

2. The battery cushion according to claim 1, wherein the first bubbles have a first wall thickness characterized by an average space between two adjacent first bubbles, the second bubbles have a second wall thickness characterized by an average space between two adjacent second bubbles, the first wall thickness is less than the second wall thickness.

3. The battery cushion according to claim 2, wherein the first wall thickness and the second wall thickness are from 1 µm to 0.3 mm.

4. The battery cushion according to claim 1, wherein a percentage of a volume of the first and second bubbles in a volume of the body is 40% to 90%.

5. The battery cushion according to claim 1, wherein a connected pore is further disposed in the body, and the connected pore has a vent and communicates with the outside of the body through the vent.

6. The battery cushion according to claim 1, wherein a thickness of the body is 0.5 mm to 20 mm.

7. The battery cushion according to claim 1, wherein the first bubbles and the second bubbles are uniformly distributed in the first and second layers, respectively.

8. A battery module, comprising:
at least two pouch-type cells, arranged in sequence along a thickness direction of the pouch-type cells; and
a battery cushion disposed between the pouch-type cells and pressed by the pouch-type cells, wherein the battery cushion comprises:
a body made of an elastic insulating material with a flat structure, the body having a first layer and a second layer arranged in a thickness direction; and
a plurality of first bubbles dispersed in the first layer and a plurality of second bubbles dispersed in the second layer, the first bubbles have a first deforming pressure and are configured to deform under an external pressure of or greater than the first deforming pressure to release a space occupied by the first bubbles, the second bubbles have a second deforming pressure and are configured to deform under an external pressure of or greater than the second deforming pressure to release a space occupied by the second bubbles, the first deforming pressure is less than the second deforming pressure, the first bubbles have a first diameter from 10 µm to 300 µm, the second bubbles have a second diameter from 500 µm to 1 mm, and the battery cushion is arranged to release the space occupied by the first and second bubbles in a progressive manner under different external pressures,
wherein the elastic insulating material is selected from the group consisting of rubber, silicon foam, polyurethane foam, or a combination thereof.

9. The battery module according to claim 8, wherein the first bubbles have a first wall thickness characterized by an average space between two adjacent first bubbles, the second bubbles have a second wall thickness characterized by an average space between two adjacent second bubbles, the first wall thickness is less than the second wall thickness.

10. The battery module according to claim 9, wherein the first wall thickness and the second wall thickness are from 1 µm to 0.3 mm.

11. The battery module according to claim 8, wherein a percentage of a volume of the first and second bubbles in a volume of the body is 40% to 90%.

12. The battery module according to claim 8, wherein a connected pore is further disposed in the body, and the connected pore has a vent and communicates with the outside of the body through the vent.

13. The battery module according to claim 8, wherein a thickness of the body is 0.5 mm to 20 mm.

14. The battery module according to claim 8, wherein the first bubbles and the second bubbles are uniformly distributed in the first and second layers, respectively.

15. A battery cushion, comprising:
a body made of an elastic insulating material with a flat structure; and
a plurality of first bubbles and a plurality of second bubbles uniformly dispersed in the body, the first bubbles have a first deforming pressure and are configured to deform under an external pressure of or greater than the first deforming pressure to release a space occupied by the first bubbles, the second bubbles have a second deforming pressure and are configured to deform under an external pressure of or greater than the second deforming pressure to release a space occupied by the second bubbles, the first deforming pressure is less than the second deforming pressure, the first bubbles have a first diameter from 10 µm to 300 µm, the second bubbles have a second diameter from 500 µm to 1 mm, and the battery cushion is arranged to release the space occupied by the first and second bubbles in a progressive manner under different external pressures, wherein the elastic insulating material is selected from the group consisting of rubber, silicon foam, polyurethane foam, or a combination thereof.

\* \* \* \* \*

UNITED STATES PATENT AND TRADEMARK OFFICE
CERTIFICATE OF CORRECTION

PATENT NO.        : 12,051,818 B2
APPLICATION NO.   : 17/139811
DATED             : July 30, 2024
INVENTOR(S)       : Guangjun Wang et al.

Page 1 of 1

It is certified that error appears in the above-identified patent and that said Letters Patent is hereby corrected as shown below:

On the Title Page

Item (72), Line 2:
Please replace "Jiawel" with "Jiawei".

Signed and Sealed this
Fifteenth Day of July, 2025

Coke Morgan Stewart
*Acting Director of the United States Patent and Trademark Office*